Jan. 14, 1930.  J. W. FRY  1,743,538
VEHICLE SPRING
Filed Jan. 10, 1928    2 Sheets-Sheet 1

John W. Fry
INVENTOR.
BY
ATTORNEY.

Jan. 14, 1930.  J. W. FRY  1,743,538
VEHICLE SPRING
Filed Jan. 10, 1928   2 Sheets-Sheet 2

Patented Jan. 14, 1930

1,743,538

UNITED STATES PATENT OFFICE

JOHN W. FRY, OF STRUTHERS, OHIO

VEHICLE SPRING

Application filed January 10, 1928. Serial No. 245,707.

This invention relates to vehicle springs. The principal object of this invention is to provide a flat spring of a leaf type having connections at each end only. This spring is under tension, when carrying a load, but the tension exerted upon this spring comes from two levers, each exerting an independent action upon this spring.

Another object of this invention is to suspend this laminated spring at each end by a pair of shackles to a frame portion of a vehicle body.

Another object of the invention is to exert a winding action on this spring wherein the winding action starts from each outer end of this spring, but winds from the outer ends inwardly as weight and irregularities of a roadway exert varying degrees of shocks and rebounds due to the wheels traversing an uneven or irregular roadway.

A still further object is to provide two springs, the outer ends of each pivoted to a bracket which is in turn carried by an axle of a vehicle. These springs carrying the weight of the vehicle, yet never subjected to reverse strains or rebounds. In the development of springs one of the difficult problems has been to provide devices which eliminate, to a desirable degree, the action of the wheels or springs when passing over rough and uneven road ways from rebounds, shocks, strains and do not tend to carry the load along evenly without exerting an energy which tends to move or throw the weight being carried or transported upon the springs from an even, forward motion.

In order to correct the imperfections of springs, shock absorbers have been devised and placed upon vehicles for the express purpose of correcting some of these undesirable conditions. It is believed that the device which is hereinafter described will show a new and useful combination of springs, levers and shackles, which, when properly assembled, will remove these disagreeable conditions to a desired degree.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawing, wherein:—

Figure 1:
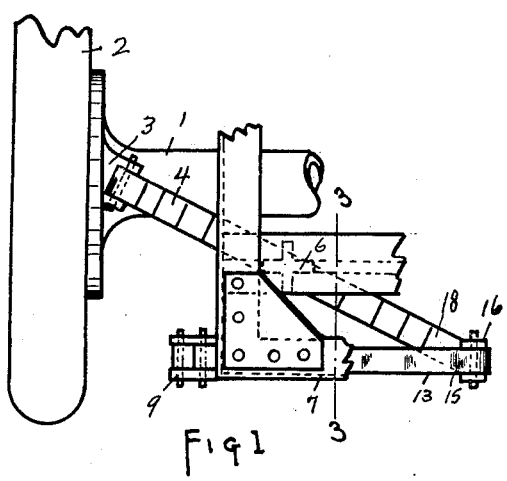
Figure 1 is a top plan view showing one wheel of the vehicle and spring arrangement attached thereto.

By referring to the drawings it will be seen that I have provided an axle 1 which is supported by wheels 2. This axle 1 is provided with brackets 3 to which are pivotally secured outer ends of springs 4. These springs 4 are provided with a pivot rest 5 to which is secured support legs 6 which are secured to a frame member 7. This frame member 7 is constructed for the purpose of carrying the body of the vehicle, being supported by the spring device described. At outer ends 8 of the frame member 7 I have provided shackles 9 which function with securing members 10 which secure outer ends 11 of a laminated spring 12 and rocker arms 13 which are positioned on top of this laminated spring 12. These rocker arms 13 are provided with a curved under surface 14. The inner ends 15 of the rocker arms 13 are each connected to a shackle 16. The ends 17 of these shackles 16 are connected to inner ends 18 of the springs 4.

It is obvious that the laminated spring 12 may be placed under constant tension by providing shackles 16 that are short enough to cause an upward bend at outer end of this spring, and at the same time exerting an upward pull on the inner ends 18 of the springs 4. It is also obvious that as the laminated spring 12 is caused to wind from the ends inwardly, the shackles 9 are placed under a downward pull holding the frame 7 and weight thereon under a constant downward tension.

Ordinary springs used in vehicle construction have been utilized for the purpose of carrying weight and being of service in flexing in one way only. In this device I am utilizing the laminated spring 12 so that it performs a double function as indicated in the above description and construction, when taken into consideration with its relation to the other connecting parts in the complete assembly.

Figure 7:
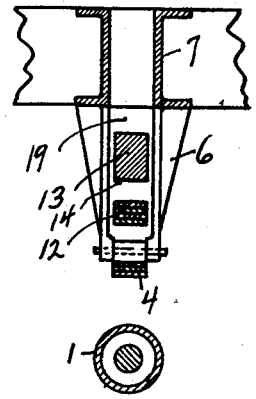
Figure 7 is a cross section taken on line 7—7 of Figure 6.
Figure 6:
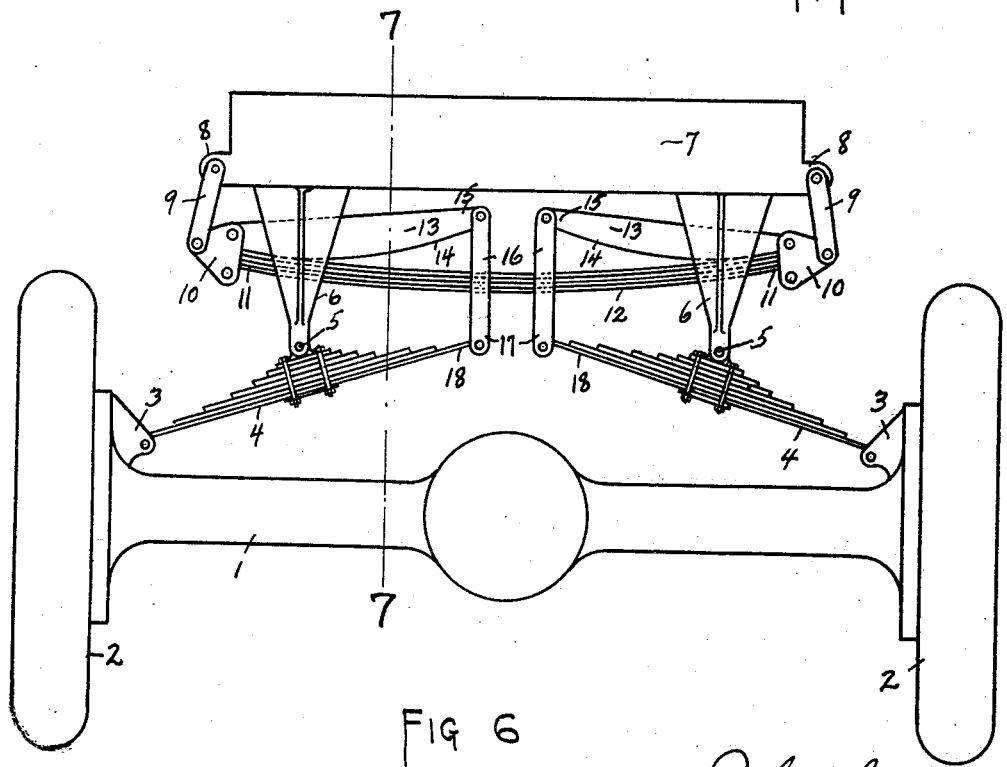
Figure 6 is a complete assembly of the spring device slightly modified from that shown in Figures 1, 2 and 4.

In Figure 6 I have shown the rocker arms 13, the laminated spring 12 and the springs 4 assembling directly under the frame member 7 and in perpendicular alignment, as clearly shown in Figure 7. In this assembly, the support legs 6 are bifurcated, providing an inner escapement way 19 through which functions rocker arms 13 and the laminated spring 12.

Figure 2:
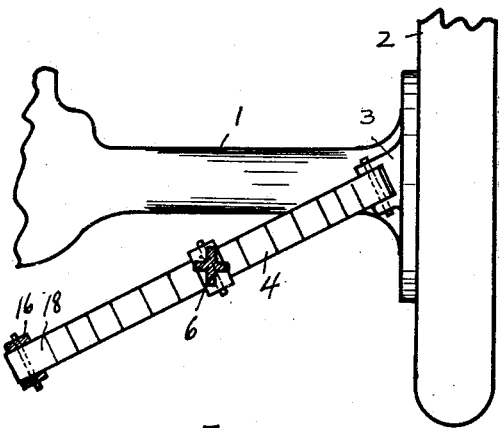
Figure 2 is a top plan view taken on section 2—2 of Figure 4.
Figure 3:
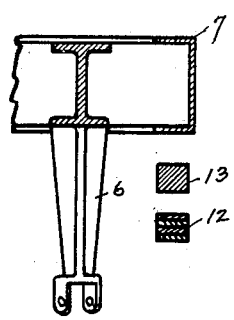
Figure 3 is a sectional view taken on line 3—3 of Figure 1.
Figure 4:
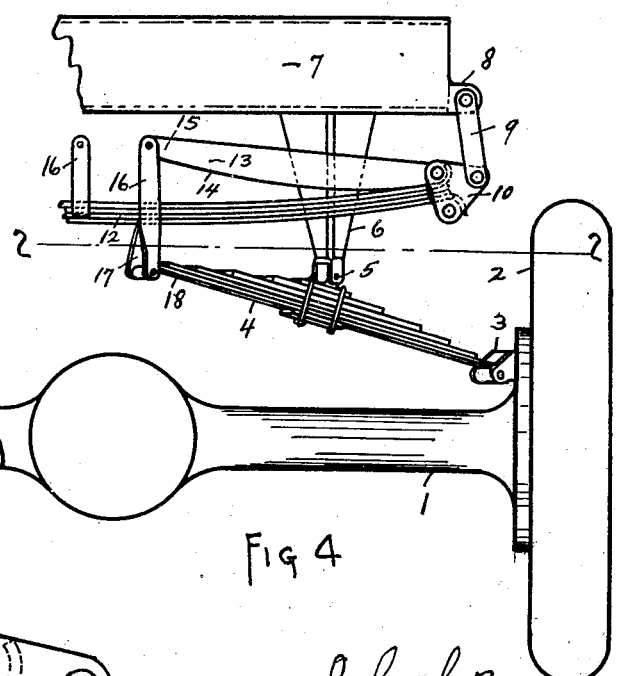
Figure 4 is a vertical view showing the device and connections with parts broken away.
Figure 5:
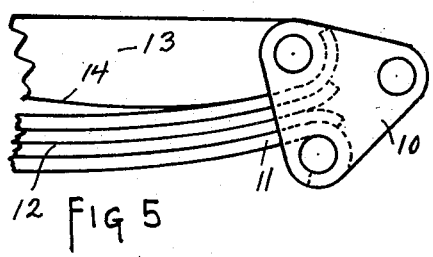
Figure 5 is a detailed view of Figure 4.

In the assembly shown in Figures 1, 2, and 4 the only differences are that the support legs 6 are not bifurcated, because it is not necessary due to the fact that the springs 4 are set out at an angle from the axle 1 which brings the inner ends 18 directly underneath the inner ends 15 of the rocker arms 13.

It is understood that the spring construction above described may be arranged and supported so that the frame member 7 and any weight desired to be carried thereon, will be much closer to the axle 1 than shown in the drawings. This may be done by changing the location of the brackets 3 in relation to the axle 1 and in lessening the distances, where found desirable, by experimentation.

It is evident that when the wheels 2 are traversing over rough and uneven roads, each wheel is exerting an independent action upon the spring combination comprising the rocker arm 13 and the laminated spring 12 and connecting parts. The curved under surface 14 of the rocker arm 13 constantly causing a winding and balancing effect upon the laminated spring 12 and thereby exerting a balancing energy upon the frame part 7 and weight carried thereon.

What I claim is:

1. In a device of the class described, the combination of two springs the outer ends of each secured to a bracket member supported by a vehicle axle housing, a support leg centrally pivoted upon each of said springs upon its upper portion and supporting a frame member of a vehicle, a flat spring, securing means at each end of said flat spring, a shackle member connecting said securing means to a frame member utilized in supporting a load, two rocker arms, each of said rocker arms having its outer ends secured to the securing means securing the outer ends of said flat spring, shackles connecting an inner end of each of said rocker arms to an inner end of each of the two springs that have their outer ends supported by the bracket member, said shackles holding all of said springs under tension, substantially as described.

2. In a device of the class described, two springs the outer ends of each secured to a bracket member supported by a vehicle axle housing, a support leg centrally pivoted upon each of said springs upon its upper portion and supporting a frame member of a vehicle, a flat spring, securing means at each end of said flat spring, a shackle member connecting said securing means to a frame member utilized in supporting a load, two rocker arms each of said rockers arms provided with a curved under surface functioning with said flat spring upon its upper surface, shackles connecting an inner end of each of said rocker arms to an inner end of each of the two springs that have their outer ends supported by the bracket member, said shackles holding all of said springs under tension, substantially as described.

3. In a device of the class described, a relatively long flat spring, securing means at each end of said relatively long flat spring, shackle means for connecting said securing means to a frame portion of the vehicle, a plurality of rocker arms provided with a curved under surface functioning with said relatively long flat spring, two springs, the outer end of each supported by a vehicle axle and wheels thereon, a support member pivotally secured on the upper surface of each of said springs, the upper end of said support secured to the vehicle frame, shackles connected under tension to the inner ends of said arms and inner ends of said springs, substantially as described.

4. In a device of the class described, the combination of a relatively long flat spring with two rocker arms the outer ends of which are secured by means of a securing means to outer ends of said relatively long flat spring, a curved under surface of said rocker arms functioning with said relatively long flat spring, shackle means for securing said securing means to a vehicle frame, two springs the outer ends of which are supported by an axle and supporting wheels of a vehicle, support legs pivotally secured to upper surface of said springs and the upper end of said support legs secured underneath a vehicle frame, means for connecting inner ends of said rocker arms to inner ends of said springs in order to hold all the springs under tension and to cause an upward bend at outer ends of said relatively long flat spring in order to cause a constant downward tension upon said vehicle frame.

5. In a device of the class described, two springs, the outer ends of said springs attached to a bracket supported by an axle and wheels thereon, inner ends of said springs provided with shackles, a relatively long flat spring positioned above said springs, each end of said relatively long flat spring provided with a securing means, two rocker arms functioning upon the upper surface of said relatively long flat spring, the upper ends of the shackles which are secured to the inner ends of the two springs secured to inner ends of said rocker arms in such a manner as to hold all the springs under tension, two support legs positioned underneath a frame or body portion of the vehicle and pivotally connected to an upper surface of said springs, means for connecting the outer ends of said relatively long flat spring and the outer ends of said rocker arms to a vehicle frame.

In testimony whereof I affix my signature.

JOHN W. FRY.